(12) United States Patent
Kanazashi

(10) Patent No.: US 6,744,876 B1
(45) Date of Patent: Jun. 1, 2004

(54) TONE SENDING DEVICE OF ELECTRONIC PRIVATE BRANCH EXCHANGE

(75) Inventor: Hidekazu Kanazashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/580,175

(22) Filed: May 26, 2000

(30) Foreign Application Priority Data

May 27, 1999  (JP) .......................................... 11-147717

(51) Int. Cl.$^7$ ................................................ H04J 3/12
(52) U.S. Cl. ...................... 379/257; 379/67.1
(58) Field of Search .............................. 379/67.1, 251, 379/257; 340/503

(56) References Cited

U.S. PATENT DOCUMENTS

| | | | |
|---|---|---|---|
| 4,979,171 A | * 12/1990 | Ashley | ..................... 379/88.28 |
| 5,127,004 A | 6/1992 | Lenihan et al. | ............. 379/525 |
| 5,521,965 A | 5/1996 | D'Alessio et al. | ..... 379/209.01 |
| 5,572,586 A | 11/1996 | Ouchi | ........................ 379/246 |

FOREIGN PATENT DOCUMENTS

| | | |
|---|---|---|
| JP | 64-41553 | 2/1989 |
| JP | 6-86376 | 3/1994 |
| JP | 2000-261551 | 9/2000 |
| WO | WO 98/32271 | 7/1998 |

* cited by examiner

*Primary Examiner*—Minsun Oh Harvey
*Assistant Examiner*—Daniel Swerdlow
(74) *Attorney, Agent, or Firm*—Foley & Lardner LLP

(57) ABSTRACT

A tone sending device of an electronic private branch exchange is provided which is capable of using a voice message from outside as a tone to inform an extension telephone or a central office line of a state of a call or a line without the necessity of taking complicated processing or of mounting additional exclusive devices. A selecting circuit is adapted to receive a PCM (Pulse Code Modulation) signal from a fixed tone generating device and the PCM signal from a voice message generating device. The selecting circuit operates, in response to a selecting signal fed from a selecting signal generating circuit, to select either of the PCM signals depending on a type of the tone to be used and to output the selected PCM signal to a time sharing switch. A CPU (Central Processing Unit) instructs the time sharing switch to connect a slot for transferring the tone outputted from the selecting circuit to inform the extension telephone of the state of the call or the line with a slot of an interface of the extension telephone.

7 Claims, 2 Drawing Sheets

TONE SENDING DEVICE OF ELECTRONIC PRIVATE BRANCH EXCHANGE

BACKGROUND OF THE INVENTION

1. Field of the Invention

The present invention relates to an electronic private branch exchange and more particularly to a tone sending device to inform a telephone or other line of a state of a call or a line.

2. Description of the Related Art

In a conventional electronic private branch exchange, a dial tone or a ring back tone to inform a state of a call or a line is sent to an extension telephone or a central office line by coding tone information converted to a PCM (Pulse Code Modulation) signal, storing it in a memory such as a ROM or a like, then reading tone PCM information from the memory in synchronization with a PCM period to produce a PCM code corresponding to a type of a tone to be used and by outputting the tone through a time sharing switch.

There are various methods for sending a holding tone using a desired tone derived from a tone source. One of the methods is to send out the holding tone by mounting a holding tone sending circuit within an electronic private branch exchange, an external voice inputting terminal and a changeover switch used to select either of a tone from the holding tone sending circuit or an external tone from the external voice inputting terminal and by transferring the selected tone as the holding tone to the extension telephone or the central office line to inform the state of the call or a line. Another method is to send out the holding tone derived from a holding tone sending device by connecting the holding tone sending device to a specified line of an interface circuit connected to a time sharing switch, by connecting the specified line through the time sharing switch to the interface circuit of the extension telephone being in an on-hold state or of the central office line, depending on an on-hold operation.

One example of a conventional digital tone generating circuit is disclosed in Japanese Patent Application Laid-open No. Hei6-086376. The disclosed digital tone generating circuit is chiefly composed of a memory circuit storing information obtained by encoding a tone signal (audible tone) converted to the PCM signal, an interval signal (continued audible tone) and an arranging tone signal (a combined signal of the tone signal and the interval signal), a SEL (selecting circuit) and a RAM circuit to designate arbitrary arranging information read from the memory circuit, and operating timing for all circuits is suitably controlled by a synchronization controlling circuit.

There is, however, a problem in the conventional tone generating circuit in that it is impossible to use an external voice message as a freely changeable tone. That is, in the conventional tone generating circuit, since a tone derived from a fixed tone source stored in the memory circuit such a ROM or a like is used, when a content of the fixed tone source is to be changed, change of the ROM itself storing the fixed tone source or use of another ROM is necessary and, in any case, the tone derived from the fixed tone source cannot be used as a freely changeable voice message.

Moreover, in the conventional tone generating circuit, there are other problems in that use of the voice message as a variety of tones to inform of the state of the call or the line, utilization of the external voice message in combination with the tone derived from the fixed tone source or selective use of either of the voice message from outside or the tone derived from the fixed tone source are impossible.

Also, in the conventional tone generating circuit designed to introduce the voice message from outside by using an exclusive interfacing device, many exclusive interfacing devices are required if two or more types of tones have to be treated.

Furthermore, in the conventional tone generating circuit not provided with such the,exclusive interfacing device, if the interfacing device is used simply as a port to introduce the external voice message, the time sharing switch that can be used to select either of the voice message or the tone derived from the fixed tone source depending on a type of the tone to be used is required.

SUMMARY OF THE INVENTION

In view of the above, it is an object of the present invention to provide a tone sending device of an electronic private branch exchange which is capable of sending out a tone informing an extension telephone or a central office line of a state of a call or a line without additional mounting of exclusive configurations or devices, or complicated processing, of using not only a predetermined tone derived from a preliminarily fixed tone source stored in a memory but also a voice message from outside and of selectively using either of the voice message or the tone derived from the tone source depending on a type of the tone to be used.

According to a first aspect of the present invention, there is provided a tone sending device of an electronic private branch exchange comprising:

a means using a voice message from outside as a tone to inform an extension telephone and/or a central office line of a state of a call or a line.

Also, according to a second aspect of the present invention, there is provided a tone sending device of an electronic private branch exchange comprising:

a first means introducing a voice message through an interface into a time sharing switch;

a second means setting a selection by a type of a tone so as to select either a predetermined tone from a preliminarily fixed tone source or the voice message; and a third means controlling the time sharing switch so as to connect a slot designated by the type of the tone for transferring a tone corresponding to the state of the call or the line, with a slot designated by the type of the tone to which a tone is desired to be outputted;

whereby the tone sending device sends selectively, selected by a type of a tone, out either the determined tone or the voice message as a variety of tones to be used to inform a telephone or other line of the state of the call or the line.

Furthermore, according to a third aspect of the present invention, there is provided a tone sending device of an electronic private branch exchange comprising:

a voice message generator for generating a voice message and outputting it as a first PCM (Pulse Code Modulation) signal;

a fixed tone generator for outputting several types of fixed tones as a second PCM signal in a predetermined order;

a switching device for receiving the voice message and outputting it to a selecting circuit, receiving a signal from the selecting circuit and outputting it to a telephone or other line;

a selecting signal generating circuit for storing tone selecting information corresponding to a type of a tone and for generating, in accordance with the tone selecting information, a selecting signal for the selecting circuit;

whereby the selecting circuit operates to receive a third PCM signal, through its one input terminal, in a state in which outputting order of each of the tones to be outputted as the first PCM signal and outputting timing of the first PCM signal conforms to the outputting order of each of the tones to be outputted as the second PCM signal and outputting timing of the second PCM signal and to receive the second PCM signal fed by the fixed tone generator through its other input terminal, and further the selecting circuit operates to select either of the second and third PCM signals depending on the type of tones to be used for informing a state of a call or a line in accordance with the selecting signal and to output a selected signal as a fourth PCM signal to the switching signal.

In the foregoing, a preferable mode is one wherein the voice message is a changeable voice message.

Also, a preferable mode is one that wherein further comprising an interface interposed between the voice message generator and the switching device, through which the voice message is introduced. Also, a preferable mode is one wherein the switching device is a time sharing switch.

Also, a preferable mode is one wherein a controller operates to output selecting information to the selecting signal generating circuit depending on the type of the tone to be used for informing the state of the call or the line and to cause the voice message inputted as the PCM signal from the interface to be subject to outputting order of types of tones outputted from the fixed tone generator and outputting timing of each of the PCM signals; and further operates to instruct the switching device to connect a slot for transferring the tone, to inform of a state showing that dialing is in progress or a telephone call is in progress during processing of calls, outputted as the PCM signal from the selecting circuit, with a slot of an interface of an extension telephone or a central office line.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

In a tone sending device of the present invention, by using an interfacing device connected to a time sharing switch (TSW), an external changeable voice message is introduced in order to use it as a tone used to inform an extension telephone or a central office line of a state of a cell or a line. Either of the external changeable voice message or a predetermined tone from a preliminary fixed tone source can be selectively used depending on a type of the tone to be used.

The selected external changeable message or predetermined tone can be sent out by controlling the TSW so that a slot for transferring the tone outputted from a selecting circuit (SEC) depending on the state of the call or the line to be informed is connected to a slot of the extension line or the central office line.

Figure 1:
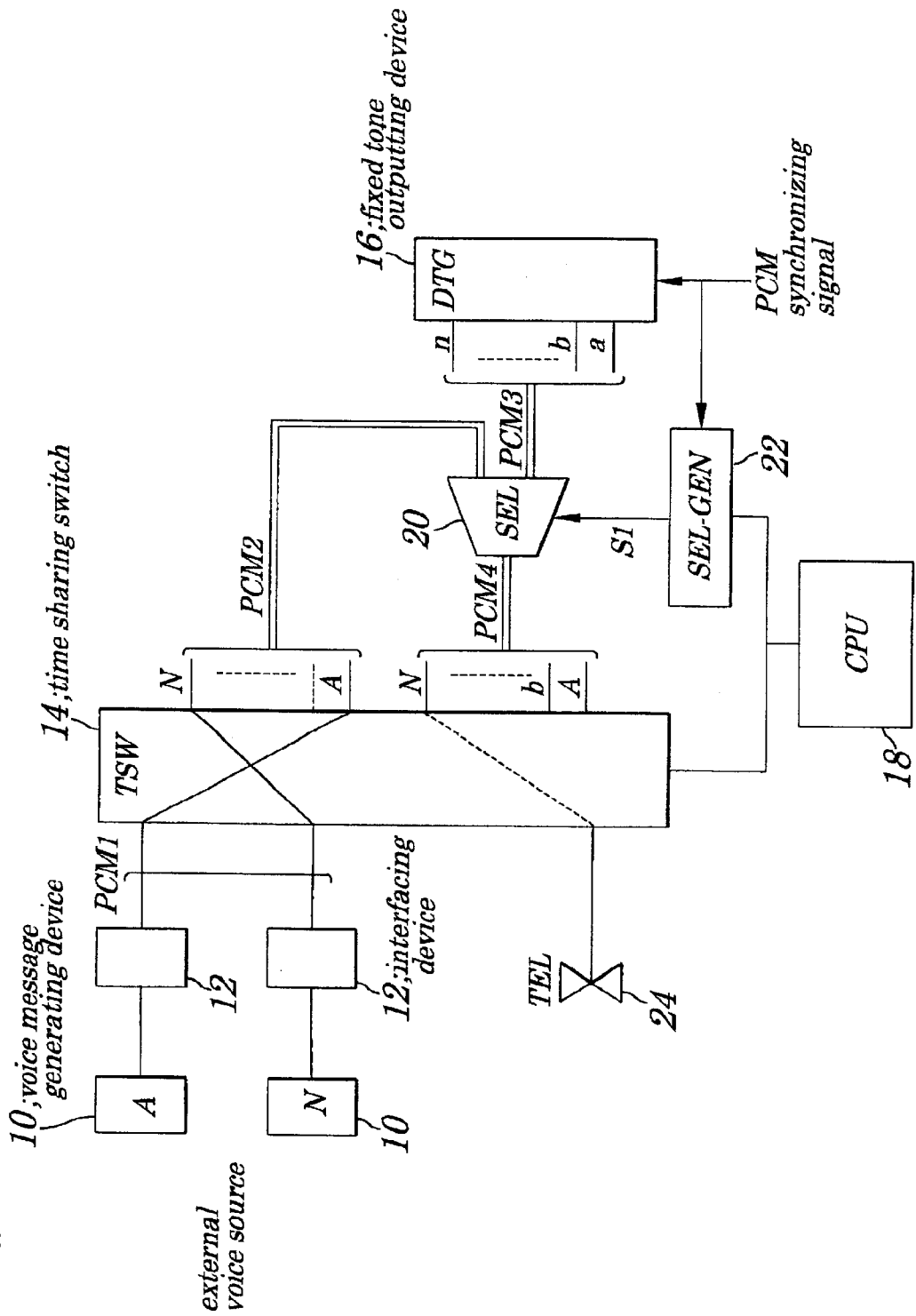
FIG. 1 is a schematic diagram showing configurations of a tone sending device according to one embodiment of the present invention.
Figure 2:
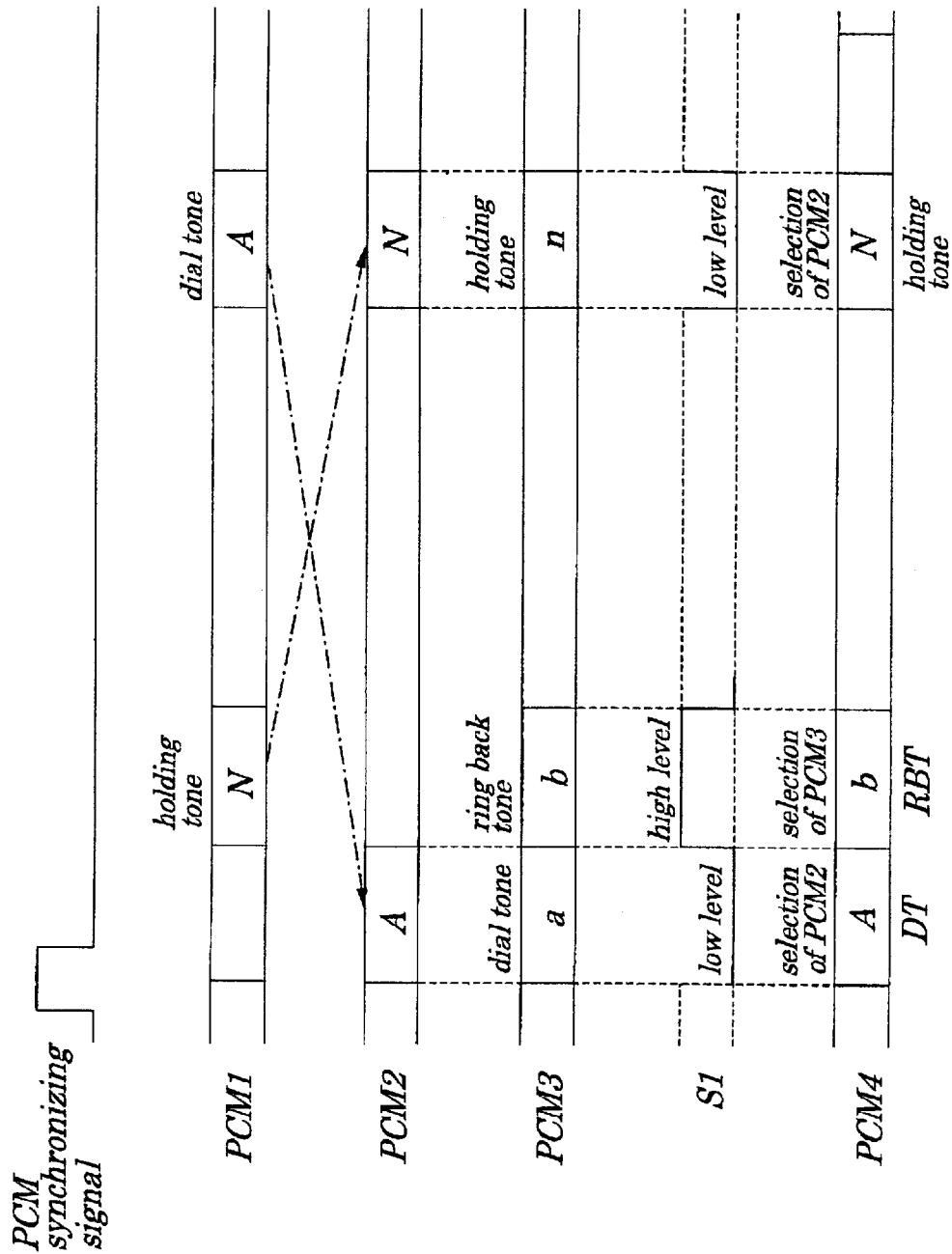
FIG. 2 is a timing chart of operations of PCM signals (PCM 1 to 4) and a selecting signal S1 according to one embodiment of the present invention.

Configurations of the tone sending device of the present invention are described below by referring to FIGS. 1 and 2. FIG. 1 is a schematic diagram showing configurations of the tone sending device according to one embodiment of the present invention. FIG. 2 is a timing chart of operations of PCM signals (PCM 1 to 4) and a selecting signal S1 according to the embodiment.

The tone sending device of an electronic private branch exchange according to the embodiment is composed of a voice message generating device 10, an interfacing device 12, a time sharing switch (TSW) 14, a fixed tone generating device (DTG) 16, a CPU (Central Processing Unit) 18, a selecting circuit (SEL) 20, a selecting signal generating circuit (SEL-GEN) 22 and an extension telephone 24. The voice message generating device 10 generates a voice message "A" to be used as a dial tone and a voice message "N" to be used as a holding tone.

The interfacing device 12 is connected to the voice message generating device 10 to receive the voice message as an input and outputs it as the PCM signal to the time sharing switch 14. If the interfacing device 12 is an analog line interfacing circuit, the interfacing device 12 operates to convert the voice messages A and N to the PCM signals. The interfacing device 12 outputs the PCM signal, with arbitrary timing, to the TSW 14. Moreover, if the interfacing device 12 is a digital line interfacing circuit, the interfacing device 12 is not operated to convert the voice messages A and N to the PCM signals, in which the conversion to the PCM code is made by the voice message generating device 10. The interfacing device 12 outputs, for example, the PCM signal I constituting one of the PCM signals obtained by the PCM conversion of the voice messages A and N, with arbitrary timing, to the TSW 14 as shown in FIG. 2.

The fixed tone generating device (DTG) 16, by using a PCM synchronizing signal which synchronizes to operations of the TSW 14 as a reference timing signal, is adapted to output the PCM signal 3 containing a tone "a" as a dial tone and a tone "b" as a ring back tone and a tone "n" as a holding tone. The outputted PCM signal 3 are fed to one of inputs of the SEL 20. Another input of the SEL 20 is connected to the TSW 14 and receives the PCM signal 2 fed from the TSW. The PCM signal 2 is composed of the PCM 1 that has been inputted into the TSW 14 and is outputted from the TSW under control of the CPU 18. The type of the tone and timing of the signal of the PCM signal 2 are adapted to conform to the PCM signal 3.

The CPU 18, in order to send out a selecting signal used to decide which PCM signal is to be selected out of the two PCM signals 2 and 3 depending on the type of the tone to be used, is adapted to set a tone source selecting information to the SEL-GEN 22. The SEL-GEN 22 operates to produce the selecting signal S1 based on the PCM synchronizing signal which synchronizes to operations of the TSW 14 and on the tone source selecting information and to output it to the SEL 20 as shown in FIGS. 1 and 2. The SEL 20, in accordance with the selecting signal S1, selects the PCM signal 2 when the selecting signal S1 is low and the PCM signal 3 when the selecting signal S1 is high. As shown in FIGS. 1 and 2, as a result of the selection, the SEL 20 outputs the PCM signal 4 to the TSW 14.

Moreover, though an arbitrary number and type of the voice message generating device 10 may be mounted, in the embodiment, the two voice message generating devices 10 are provided in order to simplify a description of the invention. Also, in the embodiment, though one voice message generating device 10 is connected to one interfacing device 12, a plurality of voice message generating devices 10 may be connected to the one interfacing device 12.

Next, operations of the tone generating device 10 according to the embodiment of the present invention will be described below in detail. The CPU 18, before the private branch exchange starts processing of the call, is adapted to obtain information preliminarily set as a requirement condition by a maintenance terminal, about which interfacing device the voice message is to be captured from, which is contained in the information about the designation of the tone provided to inform of the state of the call or the line. The CPU 18, in accordance with the above information, operates to instruct the TSW 14 to input the PCM signal 2 containing tones of the PCM signal 1 to one of inputs of the SEL 20. The CPU 18 instructs the TSW to keep the above connection until the above information is exchanged. The information about the designation of tones described above includes information as to which type of tone causes the output of the DTG 16 to be used, as to whether the voice message fed from the interfacing device 12 is to be used or not and as to whether the tone from the external voice source outputted through the interfacing device 12 to the TSW 14 is to be used or not. The CPU 18, based on the above information, operates to set the tone source selecting information to the SEL-GEN 22 and to instruct the SEL-GEN to produce the selecting signal to be fed to the SEL.

The SEL 20, when receiving the selecting signal S1 from the SEL-GEN 22, operates to select a desired PCM signal out of the PCM signals 2 and 3 that have been already inputted, in accordance with a signal level and to output selected PCM signal as the PCM signal 4 to the TSW with timing as shown in FIG. 2. The CPU 18 repeats the selection at a period of the PCM synchronizing signal until fed information is exchanged. By configuring the tone sending device of the present invention as described above, it is able to output the voice message fed from the voice message generating device 10 connected to the interfacing device 12, as the holding tone, dial tone or a like at a time of processing the call, by controlling the TSW 14 so as to connect the slot for transferring the tone used to inform the extension telephone or the central office line with the slot of an arbitrary line of the extension telephone or the central office.

Now, the CPU completes the initial setting and starts processing of the call.

Next, let it be assumed that, during processing of the call, the telephone (TEL) 24 is in an on-hold state. At this point, the CPU 18 operates to connect a PCM slot from which the holding tone of the PCM 4 being the output from the SEL 20 is outputted, that is, the PCM slot in which the PCM signal of the voice message N (see FIG. 2) is stored, with the PCM slot of the TEL 24. The CPU 18 outputs the voice message outputted from the voice message generating device 10 connected to the interfacing device 12 to the TEL 24.

Thus, the tone sending device of the present invention is capable of using freely changeable voice messages as a variety of tones used to inform of states of the call or the line, that is, it is capable of using not only the predetermined tone from the preliminarily fixed tone source but also the voice message fed from the voice message generating device connected to the interfacing device.

Moreover, the tone sending device of the present invention is capable of selecting either of the predetermined tone from the preliminarily fixed tone source or the external voice message fed through the interfacing device as the tone to inform states of the call or the line. Furthermore, it is not necessary to additionally mount exclusively processing devices or not necessary to use complicated additional procedures when such external voice messages at the time of processing calls are used as the tone, because the tone sending device is so configured that the external changeable voice message can be introduced by using the interfacing device connected to the time sharing switch which can set the selection depending on a required tone to select either the predetermined tone from the preliminarily fixed tone source or the external voice message and which can be controlled to connect the slot for transferring tone to inform of the state of calls or the line is outputted, with the slot of the line, such as of the extension telephone, to which the tone is desired to be outputted.

It is apparent that, the present invention is not limited to the above embodiments but may be changed and modified without departing from the scope and spirit of the invention. For example, though in the embodiment, the above processing of the selection of the tone source is carried out at the time of initialization before starting processing of the call, it may be performed during off-peak time periods when there little telephone usage or when a new external tone source is mounted.

Finally, the present application claims the priority of Japanese Patent Application No. Hei11-147717 filed on May 27, 1999, which is herein incorporated by reference.

What is claimed is:

1. A tone sending device of an electronic private branch exchange comprising:

a first means introducing a voice message as a first signal through an interface into a time sharing switch;

said time switch outputting said voice message as a second signal;

a second means setting a selection by a type of a tone so as to select either a third signal being predetermined tones from a fixed tone source or said second signal comprised of tones corresponding to said voice message; and a third means controlling said time sharing switch so as to conform an output order and timing of tones of said second signal to be the same as the order and timing of tones of said third signal;

whereby said tone sending device selectively sends out, selected by the type of a tone, either said second signal or said third signal as a variety of tones to be used to inform a telephone or other line of the state of the call or the line.

2. A tone sending device of an electronic private branch exchange according to claim 1, said voice message is a changeable voice message.

3. A tone sending device of an electronic private branch exchange comprising:

a voice message generator for generating a voice message and outputting it as a first PCM (Pulse Code Modulation) signal;

a fixed tone generator for outputting to a selecting circuit several types of fixed tones as a second PCM signal in a predetermined order;

a switching device for receiving said voice message and outputting it to said selecting circuit as a third PCM signal and for receiving a from said selecting circuit and outputting it to a telephone or other line;

a selecting signal generating circuit for storing tone selecting information corresponding to a type of a tone and for generating, in accordance with said tone selecting information, a selecting signal for said selecting circuit;

wherein said selecting circuit operates to receive said third PCM signal, through an input terminal thereof, in a state in which outputting order of each of said tones of said first PCM signal and outputting timing of said first PCM signal are arranged to conform to the outputting order and timing of each of said tones outputted as said second PCM signal and to receive said second PCM signal fed by said fixed tone generator through another input terminal thereof, and further said selecting circuit operates to select either of said second and third PCM signals depending on the type of tones to be used for informing a state of a call or a line in accordance with said selecting signal and to output a selected signal as a fourth PCM signal to said switching device.

4. The tone sending device of the electronic private branch exchange according to claim 3, further comprising an interface interposed between said voice message generator and said switching device, through which said voice message is introduced.

5. The tone sending device of the electronic private branch exchange according to claim 4, wherein a controller operates to output said tone selecting information to said selecting signal generating circuit depending on the type of said tone to be used for informing the state of the call or the line and to cause said voice message inputted as said first PCM signal from said interface to be subject to the outputting order of types of tones outputted from said fixed tone generator and the outputting timing of said tones constituting said second PCM signals; and further operates to instruct said switching device to connect a slot for transferring said tone, to inform of a state showing that dialing is in progress or a telephone call is in progress during processing of calls, outputted as said selected second or third PCM signals from said selecting circuit, with a slot of an interface of an extension telephone or a central office line.

6. The tone sending device of the electronic private branch exchange according to claim 3, wherein said switching device is a time sharing switch.

7. A tone sending device of an electronic private branch exchange according to claim 3, said voice message is a changeable voice message.

* * * * *